United States Patent [19]

Shuler

[11] Patent Number: 5,244,043
[45] Date of Patent: Sep. 14, 1993

[54] METHOD FOR REDUCING THE PRODUCTION OF LIQUIDS FROM A GAS WELL

[75] Inventor: Patrick J. Shuler, Yorba Linda, Calif.

[73] Assignee: Chevron Research and Technology Company, San Francisco, Calif.

[21] Appl. No.: 794,538

[22] Filed: Nov. 19, 1991

[51] Int. Cl.$^5$ .................. E21B 33/138; E21B 43/12
[52] U.S. Cl. ............................ 166/292; 166/294; 166/300
[58] Field of Search ............ 166/279, 270, 292, 294, 166/300, 305.1, 309

[56] References Cited

U.S. PATENT DOCUMENTS

| | | | |
|---|---|---|---|
| 2,238,930 | 4/1941 | Chamberlain et al. | 166/300 X |
| 3,468,129 | 9/1969 | Knutson | 166/292 X |
| 3,547,199 | 12/1970 | Froning et al. | 166/305.1 |
| 3,614,985 | 10/1971 | Richardson | 166/292 X |
| 3,633,672 | 1/1972 | Smith et al. | 166/279 |
| 3,730,272 | 5/1973 | Richardson et al. | 166/294 |
| 3,747,677 | 7/1973 | Richardson | 166/293 |
| 4,357,248 | 11/1982 | Berkshire et al. | 166/279 X |
| 4,947,934 | 8/1990 | Hen | 166/310 X |
| 5,062,483 | 11/1991 | Kisman et al. | 166/305.1 X |

*Primary Examiner*—George A. Suchfield
*Attorney, Agent, or Firm*—W. K. Turner; M. W. Carson

[57] ABSTRACT

A method for reducing the amount of liquids produced from a selected geologic formation of a gas producing well is disclosed. A solution comprising controlled quantities of a scaling cation brine and scaling anion brine such that a scale will precipitate, and a controlled quantity of a scale inhibitor such that the scale precipitation will be delayed, is injected into the formation. The well is then shut-in long enough to allow the injected mixture to precipitate scale and to reduce the permeability of the formation such that a substantial portion of liquids that had been produced before, no longer are produced upon a resumption of gas production.

13 Claims, 1 Drawing Sheet

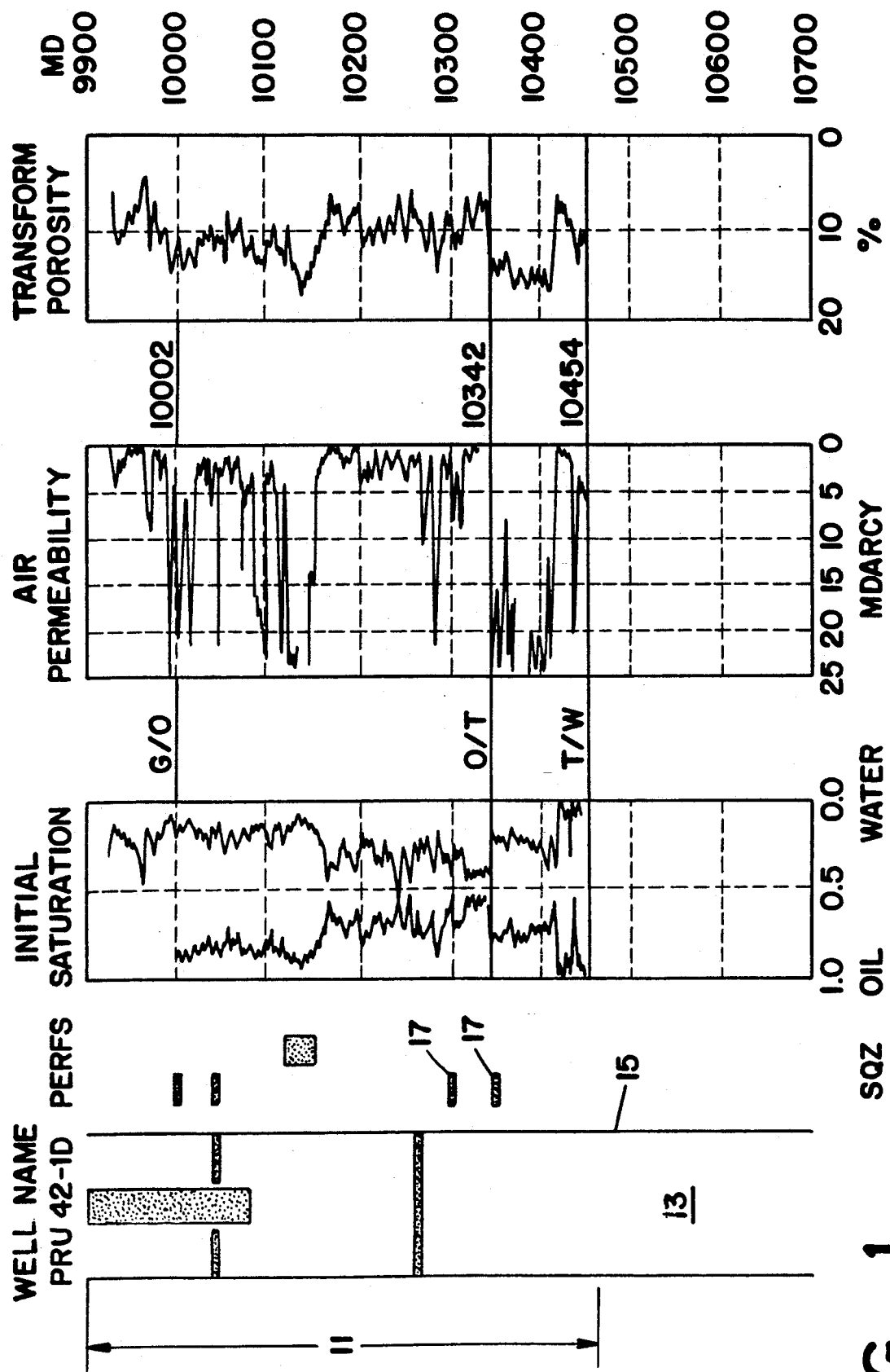
FIG_1

METHOD FOR REDUCING THE PRODUCTION OF LIQUIDS FROM A GAS WELL

FIELD OF THE INVENTION

The present invention relates generally to the prevention of liquid production in a gas well. The invention specifically provides a method for injecting controlled quantities of cations, anions, and a scale inhibitor into a production geologic formation to block production of liquids contained therein.

BACKGROUND OF THE INVENTION

In the production of gas from subterranean reservoirs, associated liquids, such as oil and water are commonly coproduced. Such liquids are often undesirable, and the rate of the liquid production often increases compared to the amount of gas production. For example, water-coning of a gas well is a serious problem.

Prior efforts have attempted to selectively shut off water production from oil or gas wells. SPE paper No. 14822, by D. D. Dunlap et al. entitled "Method For Improving Hydrocarbon/Water Ratios in Producing Wells", describes the use of an amphoteric polymer which is injected into the productive formation to absorb and preferentially block the water. The idea behind the use of aqueous based polymer gels is to inject a low viscosity polymer solution into the formation that also contains a crosslinking agent. After a suitable shut-in period, the polymer will react and form a stiff crosslinked gel that will decrease the formation permeability.

A major disadvantage is the relatively high cost of both the chemicals and the process. Also, the chemical bonds in polymer gels are prone to thermal degradation after several months in a formation.

U.S. Pat. No. 4,428,424 discloses a method of preferentially blocking water by combining saltwater with a silicate and an acid to produce a silicate that blocks produced water but allows oil to flow. This treatment is also very costly.

Several U.S. Pat. Nos. 4,869,621; 4,844,164; 4,287,951; 4,301,867; 3,342,262; 4,773,483; 4,745,976 suggest using inorganic precipitates such as scale as a means to plug off production from productive geologic formations. Generally, these methods require sequentially injecting incompatible fluids, such that in-situ mixing occurs to trigger precipitation. None of these methods use a scale inhibitors compound to act as a time control for the process Scale formation can occur as a result of mixing of incompatible waters in the well, i.e., waters which when mixed produce precipitates, or as a result of temperature and pressure changes and the like in the produced waters during production. Generally, incompatible waters are formed as a consequence of waterflooding, for example, as injected sea water mixes with formation water in the borehole during water breakthrough. The more common concern is scales deposited because of changes in supersaturation of solubility of minerals in the formation or produced waters caused by pressure and temperature changes, or changes in other physical and chemical environments such as gas compositions, ratio of gas/oil/water. Precipitation frequently encountered as scale include calcium carbonate, calcium sulfate, barium sulfate, magnesium carbonate, magnesium sulfate, and strontium sulfate. The deposition of scale is a very complex crystalline process initiated by a supersaturation-induced nucleation of a precipitate of the mineral, scale ions contact these nuclei and the crystal grows in a certain crystalline pattern. The adherence of these mineral crystals unto the formation matrix, perforation, wellbore, tubings and equipment is a not well-understood process but once initiated, appears to be spontaneous as seen by the increasing thickness of the scale deposit and the steady decline in productivity.

U.S. Pat. Nos. 4,002,204; 3,730,272; 3,682,245; and 3,747,677 disclose methods of incorporating time control over deliberate precipitation to reduce fluid production, however none use a scale inhibitor.

U.S. Pat. No. 4,947,934 discloses a method of inhibiting the formation of scale in a well by injecting an acidic aqueous solution of a polyvalent cation and a polyacrylate scale inhibitor. As the acid is consumed by the reservoir rock, the pH of the solution is sufficiently raised to cause controlled precipitation. This method avoids premature plugging of the formation and extends the life of the scale inhibitor treatment. There is no discussion of preferentially blocking the flow of liquid in favor of gas in the well. The use of such scale inhibitors is well known in the art to protect scales from forming in the perforations or near well bore areas or other equipment.

U.S. Pat. No. 5,002,126 describes a method of inhibiting scale in a non-carbonate reservoir by injecting a soluble surfactant metal salt containing a terminal metal ion which is absorbed on the rock surface, and thereafter injecting scale inhibitor. The result is that scale inhibition is provided over an extended period of time. There is no discussion of any effect on gas vs. liquid production form the reservoir.

None of the prior art discloses the injection of scale inducing brines with a scale inhibitor to preferentially reduce the production of liquids from a reservoir. There is therefore a need for such a method that can be performed quickly and economically.

SUMMARY OF THE INVENTION

The present invention provides a method for reducing the amount of liquid that is produced from a selected geologic formation that produces gas, such as hydrocarbon gas. A solution is mixed together that comprises a combination of a controlled quantity of a scaling cation brine and a controlled quantity of a scaling anion brine such that a scale will be induced to precipitate out, and a controlled quantity of a scale inhibitor such that the scale precipitation will be delayed for a controlled period of time. Well production is stopped and the mixed solution is injected into the geologic formation, such that injection is completed prior to the end of the controlled period of time.

The well is then shut-in for a length of time that is sufficient to allow the mixture to precipitate scale and to reduce the permeability of the selected formation, such that a substantial portion of prior liquid production is prevented.

It is then desireable to resume production of the gas from the selected formation. In another embodiment of the invention, the shut-in time is sufficient to permit a desired amount of invasion of the injected mixture into the formation.

In a further embodiment of the invention, a controlled quantity of gas is injected into the selected formation along with the mixed solution, to further divert the mixture toward a high-fluid zone of the formation.

The above and other embodiments, objects, advantages, and features of the invention will become more readily apparent from the following detailed description of the intention, which is provided in connection with the accompanying drawing.

DESCRIPTION OF THE DRAWING

FIG. 1 is a schematic drawing that shows the perforation locations, initial saturation, air permeability, transform porosity, and fluid levels of the tested well No. PRU 42-1D.

DETAILED DESCRIPTION OF THE INVENTION

Referring to FIG. 1, a selected subterranean formation is penetrated by a wellbore 13 including a casing 15 in fluid communication therewith by means of well casing perforations 17 in the zone of the formation 11. Production occurs from the formation 11 by the flow of fluids including oil, gas and water through the perforations 17 into the well bore 13 with the fluids then being recovered.

The present invention comprises a method for reducing the production of liquids from a selected gas productive formation of a well. The gas that is desireable to produce is generally a hydrocarbon gas, however the inventive method will enhance the production of other gasses as well, such as $CO_2$.

Brines that precipitate as scale deposits from an aqueous solution are mixed with a selected scale inhibitor and the mixture is injected into the selected formation so that the permeability of the formation is reduced such that undesirable liquids such as water are restricted from being produced any longer from the selected formation. The scale inhibitor acts to control the time that the precipitate forms in-situ, to allow the mixture to penetrate further into the formation from the wellbore. The inventive method is particularly suitable for preventing or retarding water coning in a gas well.

It is preferable that the well remains shut-in during the time that precipitation of the scale occurs, to maximize the extent of the precipitation. After the well is shut-in for several hours, gas production may be resumed, and the amount of produced liquids will now be substantially reduced. The concept is similar to prior efforts that utilize a polymer gel, however the inventive method uses chemicals that are much less expensive than a polymer gel, and the cost of the novel procedure is also less expensive than methods that use a polymer gel. Also, the chemical bonds in polymer gels are prone to thermal degradation after several months in a formation.

By "scale inhibitors", we mean chemical additives that will prevent or retard the formation of water-borne scale deposits even at low concentrations of additives. Types of scale inhibitors that would work in the present invention include but are not limited to, phosphate esters, phosphonates, and possibly polymeric products such as polyacrylates, polyacrlyamides, and polymaleic acids. Squeeze treatments commonly use phosphonate chemistry.

By "stopping well production", we mean halting normal production. After production has been stopped, mechanical procedures are performed to cause the injection of a fluid mixture into a selected geologic formation(s).

By "shutting-in a well", we mean halting fluid injection, not permitting any well production, and allowing the injected fluid mixture time to react in pore spaces of the formation.

By "resuming well production", we mean resuming the normal production of fluids from the well.

In one embodiment of the invention, a solution is mixed together which comprises a combination of a controlled quantity of a scaling cation brine and a controlled quantity of a scaling anion brine, such that the combination will precipitate a scale, and a controlled quantity of a scale inhibitor such that the precipitation of scale will be delayed for a controlled period of time.

The scaling cation brine may comprise any cation. Cations having a valence of two or greater, such as $Ca^{+2}$, $Cr^{+3}$, $Ti^{+3}$, $Ba^{+2}$, $Al^{+3}$, $Fe^{+3}$, and $Zr^{+4}$ in the form of a water soluble salt are known to be effective. Alkaline earths, such as calcium, strontium, and barium, are particularly suitable. The scaling anion brine may comprise any anion. Sulfate and bicarbonate are particularly suitable anions. Sodium sulfate and sodium bicarbonate mixed with water are especially suitable scaling anion brines. It is desireable that the precipitated scale be insoluble to various acid treatments that are commonly used in the well production art. Commonly precipitated scale includes calcium carbonate, calcium sulfate, barium sulfate, magnesium carbonate, magnesium sulfate, and strontium sulfate. Barium sulfate and calcium sulfate (whether in its hydrated or anhydrous form) are particularly useful. In the preferred embodiment, calcium sulfate is preferred, as barium sulfate tends to precipitate too quickly, even with a scale inhibitor and even with a low salt concentration. Calcium sulfate scale is also preferred as it can be removed at a later time, via a dissolver or a converter plus acid, unlike barium sulfate.

To form a scale, it is not necessary to use a specific proportion of cation or anion scaling brine. The required proportions may vary depending on the particular anions and cations utilized. Required proportions can easily be determined by one of ordinary skill in the art of well production. For example, about equal proportions of calcium chloride and sodium sulfate is desireable to produce a scale.

Almost any source of water can be used to create an aqueous solution of a cation or anion brine. Tap water is effective, and almost any brine would work, although it might affect the particular scale inhibitor chosen.

Relatively low concentrations of water-soluble, organic scale inhibitors are known to reduce the rate of scale formation in and around the bottom of a producing well. The mechanism of the inhibition is probably a combination of sequestering or complexing of multivalent cations and an absorption of inhibitor onto solid surfaces such as the rapid growth planes of newly formed crystallites. Although a wide variety of materials inhibit crystal growth, the compounds most commonly used in well treatments are organic phosphates or phosphonates, adducts of acrylic acid or the like. Where supersaturated, or scale-forming waters are encountered in an oil production operation, scale inhibitors are commonly injected or "squeezed" into the reservoir formation. The squeezing amounts to injecting the inhibitor and, usually over-flushing the treated zone with water. In recent years a procedure called "precipitation squeeze" has been developed. In this process, the scale inhibitor reacts or is reacted to form an insoluble salt which precipitates in the pores of the formation rock. For example, phosphonates and polymeric carboxylates can be precipitated as the calcium salt.

Various scale inhibitors known in the well production art may be used in the inventive method. These include phosphonates, phosphate esters, and polymer products such as polyacrylates and polymaleic acids. A phosphate ester scale inhibitor manufactured by Nalco, called "H372®" is a particularly useful scale inhibitor.

The scale inhibitor acts to delay the precipitation of scale for a controlled period of time, even at the temperature, pressure, and chemical conditions that exist in the selected geologic formations(s) near the wellbore. The presence of the scale inhibitor further acts to allow the mixture to penetrate a larger distance (typically up to 10 feet) into the formation prior to precipitation of scale. The time delay of scale precipitation can be controlled by using controlled quantities of various scale inhibitors. In many cases, a time delay of 12 to 24 hours is sufficient to permit adequate injection of the mixture into the formation, although a time delay of 4 to 48 hours is not unusual.

After well production is stopped, a controlled quantity of the cation/anion/scale inhibitor mixture is then injected into the selected formation(s). Injection of the mixture into the formation should be completed prior to the end of the controlled period of time of scale precipitation delay. Fluid injection means into selected geologic formations are well known in the well productions art. Knowing the calculated solubility of the scale to be precipitated, the type and amount of scale inhibitor required can be easily calculated by one of ordinary skill in the art, to cause a desired amount of scale to be precipitated. For example, 2% solutions of calcium and sulfate ions were mixed with 1000 mg/l of the "H372®" scale inhibitor to anticipate that about 7 pounds of calcium sulfate per 42 gallon barrel of the injected mixture will precipitate. It may be necessary to heat certain scaling ion brines to ensure proper dissolution.

The well is then shut-in for a length of time that is sufficient to allow the mixture to precipitate scale in and thereby reduce the permeability of the selected formations(s), such that a substantial portion of the liquid production of the well is prevented. In the preferred embodiment, the second period of time is sufficient to allow a desired amount of invasion of the mixture into the selected formation(s).

The length of time that the well needs to be shut-in can be determined by one of ordinary skill in the art. It depends on the type and amount of chemicals that were injected, and the reservoir characteristics of the selected formations(s). A shut-in time of 4 to 6 hours is typical, although it could be longer or shorter depending on the characteristics of the individual well.

In another embodiment of the invention, after the shut-in period, a second solution comprising a combination of a controlled quantity of a non-scaling brine and a controlled quantity of a second scale inhibitor is injected into the selected formation. The well is then shut-in for a second length of time such that the second scale inhibitor is absorbed into the formation to reduce the amount of scale precipitation that results from liquids that are produced when production resumes.

Any non-scaling brine known in the art may be used. The second scale inhibitor may be the same as the scale inhibitor used in the first injected mixture. Necessary quantities of each can be easily determined by one of ordinary skill in the art.

This injection of a second scale inhibitor reduces the amount of scale precipitation that may occur, from liquids that may be produced when production resumes. It is not unusual that the first liquids produced will have high concentrations of scaling ions. Therefore, precipitation may occur as these liquids are produced and travel through various production equipment, thereby plugging and damaging the equipment. The length of time of the second shut-in period can vary, but can be estimated by one of ordinary skill in the art of well production. Typically, a time period of about 12 to 24 hours would be expected for the second scale inhibitor to be adequately absorbed into the selected formation(s), although time periods of 4 to 48 hours would not be unusual.

Prior to implementation of the inventive method, the selected production well produced both a gas and a liquid. Production of the liquid is often undesirable, especially if the liquid has no economic value, such as salt water. Water production in a gas well often originates from a zone of relatively high water saturation, as known in the art of reservoir geology. After a period of time, a phenomenon known as water coning occurs, whereby water is drawn up from lower elevations in the formation and is produced along with the gas. To reduce the permeability of the selected formation such that a substantial portion of the liquid production is prevented is defined to mean that the permeability of the formation is reduced by scale precipitation to a value such that a liquid such as salt water no longer is produced at undesirable amounts.

The injected scaling brines and scale inhibitor preferentially invade the zones of relatively high water saturation rather than those portions of the formation that are comprised of gas containing sands. After precipitation, the permeability of the gas zones is reduced little, if at all.

In another embodiment of the invention, production of the gas from the selected formation(s) of the well is resumed, after precipitation of the scale has occurred.

In a further embodiment of the invention, a controlled quantity of gas is injected into the selected formation(s) along with the controlled quantity of the mixture of scaling brines and the scale inhibitor. This method acts to further divert the mixture toward a high-liquid zone of the formation, and away from the gas interval. Fluid diversion toward a zone of high water saturation would also be enhanced by the addition of a controlled quantity of a foam. Foams useful in the inventive method are well known in the well production art.

EXAMPLE

This example illustrates the unexpected results and the benefits provided by injecting scaling brines and a scale inhibitor into a selected formation. We planned to completely seal off a producing zone of well no PRU 42-1D, in Painter Field in Wyo, by injecting a fluid mixture which would cause an acid resistant precipitate to reduce the permeability therein. It was then planned to recomplete the well in a lower zone.

The results showed that the treatment successfully stopped water and oil production, but had no effect on the gas production. Therefore, the method would be useful to reduce water production in a wet-gas well without significantly decreasing the gas production.

The proposed method was estimated to cost about $5,000, to inject precipitating brines mixed with a scale inhibitor, to give a desired time-delay reaction. The target reaction time was several hours, enough time to pump the mixture down the tubing, and a few feet into the formation. Ideally, a large volume of scale would precipitate and reduce the permeability of the formation to near zero.

Bottle precipitation tests were initially performed to determine a suitable mixture of scaling brines and a scale inhibitor. The test mixtures contained a scale inhibitor known as "H372®" manufactured by Nalco. This scale inhibitor is a phosphate ester, although other scale inhibitors could also have been used. Sodium sulfate was selected as an anion, and both barium chloride and calcium chloride were separately included, mixed in tap water, as cations. The resulting barium sulfate and calcium sulfate scales were selected because they are insoluble to most acids used in the well production industry, so that any late acid treatment would not reopen the zones.

The times to precipitate BaSO4 or CaSO4·2H2O (gypsum) at varying chemical compositions and conditions, under laboratory conditions were determined. Table 1, below shows the results for an initial design test. Barium and sulfate, and calcium and sulfate were added in approximately equal molar concentrations. The results showed that calcium was preferable to barium, as the calcium sulfate began to precipitate at a longer, more desirable time period, with this particular scale inhibitor. Furthermore, gypsum (CaSO4·2H2O) is a preferable precipitate over barium sulfate, as gypsum could be removed at a later time, if necessary, via a dissolver or a converter mixed with an acid. It would be very difficult to remove deposited barium sulfate via a chemical treatment.

TABLE 1

FIRST SCREENING TEST OF INHIBITED SULFATE SCALE SYSTEMS
Room Temperature
Scale Inhibitor: Nalco "H372 ®", 1000 $^{mg}/1$

| Sample | Added Salt - wt % | | | Time to Onset of Precipitation |
|---|---|---|---|---|
| | BaCO2·2H2O | CaCl2·2H2O | Na2SO4 | |
| I-A | 1 | | 0.5 | <1 minute |
| I-B | 2 | | 1 | <1 minute |
| I-C | 5 | | 2.5 | <1 minute |
| I-D | | 1 | 1 | >24 hours |
| I-E | | 2 | 2 | >24 hours |
| I-F | | 5 | 5 | 1-2 minutes |

A second series of tests focused on various concentrations of the scale inhibitor that were required to provide the desired time delay of several hours, before the onset of scale precipitation. Only calcium was considered as a cation in these tests. The test results, shown in Table 2 below, indicate that a concentration of the "H372®" phosphate ester scale inhibitor that is between 100 mg/l and 1000 mg/l is needed to provide the desired time delay of several (meaning about 5 to 10) hours prior to the onset of precipitation.

TABLE 2

INCREASING SCALE INHIBITOR CONCENTRATION DELAYS ONSET OF GYPSUM PRECIPITATION
Room Temperature
Test Mixture: CaCl2·2H2O, 2% NA2SO4 in tap water

| Sample | Concentration of Added H372 Inhibitor ($^{mg}/1$) | Time to Onset of Precipitation |
|---|---|---|
| II-A | 0 | 30 seconds |
| II-B | 25 | 4 minutes |
| II-C | 100 | 30 minutes |
| II-D | 1000 | >24 hours |

A third and final series of tests was performed at a temperature of 175° F., which is representative of typical conditions at the bottom of a wellbore. Again, only the calcium-sulfate-"H372®" scale inhibitor system was incorporated. The tests tracked the relative amount of precipitation that had formed over an elapsed time. All tests included a mixture of 2% calcium chloride mixed with 2% sodium sulfate mixed in tap water. Varying amounts of scale inhibitor were added. In addition, the tests were run both with and without 10 g of sand (Ottawa sand) per 100 ml of solution. The results of the tests are shown in Table 3, below.

Table 3 illustrates that a 1000 mg/l dosage of "H372®" scale inhibitor is required to delay precipitation for several hours if no sand was added. At 6 hours, only a small amount of precipitation had occurred, but by 18 hours, a heavy amount of precipitation had occurred. The addition of the sand did not have an appreciable effect on the test results.

TABLE 3

TEST OF INHIBITED GYPSUM SCALING SYSTEM AT RESERVOIR TEMPERATURE
Temperature 175°
Test Mixture: 2% CaCl2·2H2O, 2% NA2SO4 in tap water

| Sample | Added "H372" Inhibitor ($^{mg}/1$) | Solids Added* | Amount of Precipitate Versus Elapsed Time | | | | |
|---|---|---|---|---|---|---|---|
| | | | 10 min | 30 min | 2 hr | 6 hr | 18 hr |
| III-A | 100 | No | S | H | H | H | H |
| III-B | 300 | No | N | S | S | S | H |
| III-C | 500 | No | N | N | S | M | H |
| III-D | 1000 | No | N | N | N | S | H |
| III-E | 100 | Yes | S | H | H | H | H |
| III-F | 300 | Yes | N | S | S | M | H |
| III-G | 500 | Yes | N | N | S | M | H |
| III-H | 1000 | Yes | N | N | N | M | H |

*Included 10 g Ottawa sand/100 ml solution
Precipitation Code:
N - none
S - small
M - medium
H - heavy

FIELD TRIAL

Based on the test results referred to above, a field test was planned whereby a 2% aqueous solution of calcium and sulfate salts were mixed with 1000 mg/l of the "H372®" scale inhibitor. The producing sandstone formation of well no. PRU 42-1D in Painter Field of Wyo. was selected as a test zone.

From the calculated solubility of gypsum, it was estimated that about 7 lbs of solid would precipitate per barrel of injected mixture. This corresponds to approximately 1% of the injected volume precipitating.

A mixture of 225 barrels of fresh water and 200 barrels of the scaling solution mixture (about 30 gallons per foot) were injected into the perforations at about 10,130 feet, measured depth, as shown in FIG. 1. The injection process went according to plan. FIG. 1 also shows the initial water saturation, air permeability, and transform porosity of the formation.

The test of the inventive method, shown in Table 4, below, resulted in the relatively quick elimination of the production of liquids (both oil and water) from the formation. Gas production, however, unexpectedly remained unchanged at about 4200 MCF per day. It appears that sufficient gypsum scale was precipitated to block the flow of the liquids through the formation, while the gas phase was not affected.

It may therefore be concluded that this novel method would be useful in preventing the production of water from a gas well. The inventive method is relatively easy to perform, and is inexpensive, especially compared to the cost of a polymer gel process which would be about ten times greater. A further advantage of the inventive method is that all mixing of the chemicals can occur at the surface.

TABLE 4

Fluid Production at Well PRU 42-ID
Well Tests Between Day 1 and Day 20

| Test Day | Oil BOPD | Gas MCFPD | Water BWPD | Gor SCF/B | Water CUT-% | Surf CHOKE | DHole CHOKE | TBG PRESS | CSG PRESS |
|---|---|---|---|---|---|---|---|---|---|
| 1 | 53 | 4286 | 1 | 80868 | 1.9 | 17 | 0 | 2700 | 0 |
| 2 | 54 | 4261 | 0 | 78907 | 0.0 | 17 | 0 | 2700 | 0 |
| 3 | 48 | 4241 | 1 | 88354 | 2.0 | 17 | 0 | 2704 | 0 |
| 4 | 45 | 4202 | 0 | 93378 | 0.0 | 17 | 0 | 2715 | 0 |
| 10 | 0 | 4734 | 0 | * | * | 17 | 0 | 3000 | 1050 |
| 15 | 0 | 4087 | 13 | * | 100.0 | 12 | 0 | 3110 | 1450 |
| 16 | 0 | 4096 | 1 | * | 100.0 | 11 | 0 | 3100 | 1500 |
| 19 | 0 | 4303 | 0 | * | * | 10 | 0 | 3100 | 1500 |
| 20 | 0 | 4174 | 0 | * | * | 0 | 0 | 0 | 1500 |

| Test Day | LIN PRESS | N2 CUT-% | G-Lift MCFPD | API GRAV | SEP H/L | Cos LOAD | Test COMMENTS |
|---|---|---|---|---|---|---|---|
| 1 | 0 | 24.82 | 0 | 75.7 | H | No | |
| 2 | 0 | 24.83 | 0 | 52.0 | H | No | |
| 3 | 0 | 24.83 | 0 | 52.0 | H | Yes | Chromatograph Bad |
| 4 | 0 | 0.00 | 0 | 75.7 | H | No | Chromatograph Bad |
| 10 | 0 | 0.00 | 0 | * | H | No | si - froze off |
| 15 | 0 | 25.16 | 0 | * | H | No | No oil |
| 16 | 0 | 24.95 | 0 | * | H | No | No oil |
| 19 | 0 | 25.17 | 0 | * | H | No | .2 bopd |
| 20 | 0 | 25.17 | 0 | * | H | No | .3 bopd |

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claimed is:

1. A method for reducing the production of liquids from a selected gas productive formation of a well comprising the steps of:
   (a) mixing together a solution comprising a combination of a controlled quantity of a scaling cation brine and a controlled quantity of a scaling anion brine such that said combination precipitates a scale, and a controlled quantity of a scale inhibitor such that said scale precipitation would be delayed for a controlled period of time;
   (b) stopping production of said well;
   (c) injecting a controlled quantity of said mixture into said selected formation such that said mixture is injected prior to the end of said controlled period of time; and
   (d) shutting in said well for a length of time sufficient to allow said mixture to precipitate scale in and reduce the permeability of said selected formation such that a substantial portion of said liquid production is prevented.

2. The method of claim 1 further comprising the step of resuming production of said gas from said selected formation of said well.

3. The method of claim 1 further comprising steps:
   (e) injecting a second solution comprising a combination of a controlled quantity of a non-scaling brine and a controlled quantity of a second scale inhibitor into said selected formation; and
   (f) shutting in said well for a second length of time such that said second scale inhibitor is absorbed into said selected formation to reduce the amount of scale precipitation resulting from liquids that are produced upon a resumption of production.

4. The method of claim 3 wherein said scale inhibitor is the same as said second scale inhibitor.

5. The method of claim 1 wherein said gas is a hydrocarbon gas.

6. The method of claim 1 wherein said length of time is sufficient to allow a desired amount of invasion of said mixture into said selected formation.

7. The method of claim 1 wherein said scaling cation is selected from the group alkaline earths.

8. The method of claim 7 of wherein said scaling cation is selected from calcium, strontium, and barium.

9. The method of claim 1 wherein said sealing anion is selected from the groups sulfates and bicarbonates.

10. The method of claim 1 wherein said scale inhibitor is selected from the groups phosphates, phosphate esters, and polymer products.

11. The method of claim 1 wherein a controlled quantity of a gas is injected into said selected formation along with said controlled quantity of said mixture, to further divest said mixture toward a high-liquid zone of said formation.

12. The method of claim 1 wherein a controlled quantity of a foam is injected into said selected formation along with said controlled quantity of said mixture, to further divert said mixture toward a high-liquid zone of said formation.

13. A method for reducing the production of liquids from a selected gas productive formation of a well comprising the steps of:
   (a) stopping production of said well;
   (b) injecting a controlled quantity of a solution comprising a combination of a controlled quantity of a scaling cation brine and a controlled quantity of a scaling anion brine such that said combination precipitates a scale, and a controlled quantity of a scale inhibitor such that said scale precipitation would be delayed for a controlled period of time, into said selected formation, such that said injection is completed prior to the end of said controlled period of time; and
   (c) shutting in said well for a length of time sufficient to allow said mixture to precipitate scale in and reduce the permeability of said selected formation such that a substantial portion of said liquid production is prevented.

* * * * *